Dec. 12, 1950  J. A. SOLTIS  2,533,527
BABY'S AUTOMOBILE SEAT
Filed July 2, 1948  2 Sheets-Sheet 1
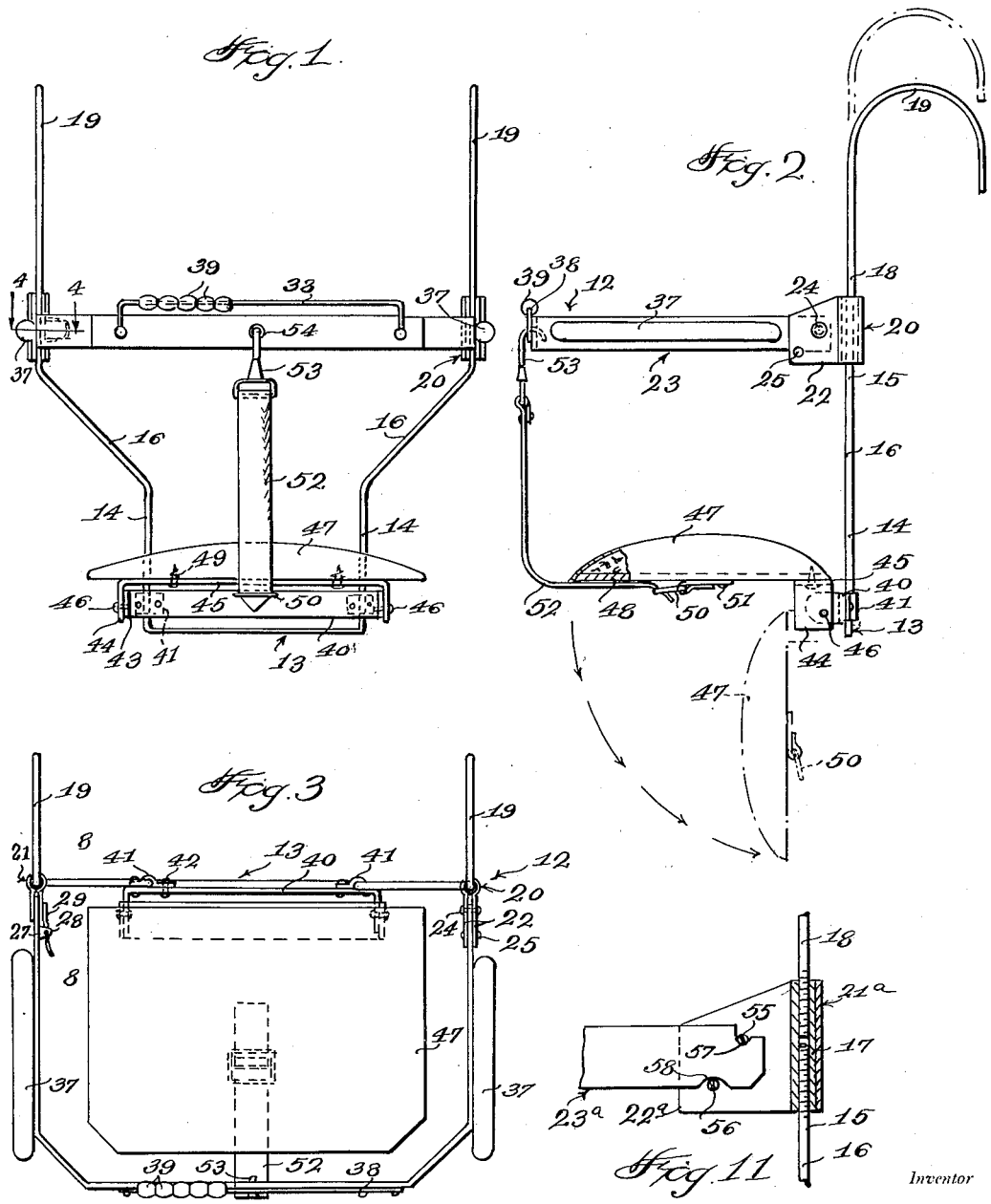
Inventor
John A. Soltis
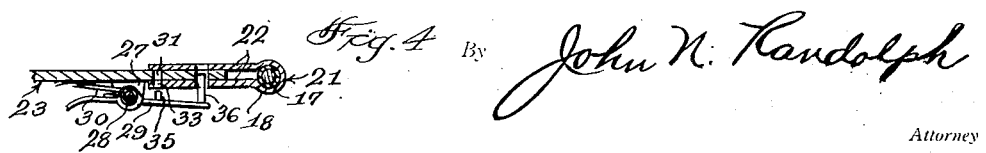
By John N. Randolph
Attorney Dec. 12, 1950
J. A. SOLTIS
2,533,527
BABY'S AUTOMOBILE SEAT
Filed July 2, 1948
2 Sheets-Sheet 2
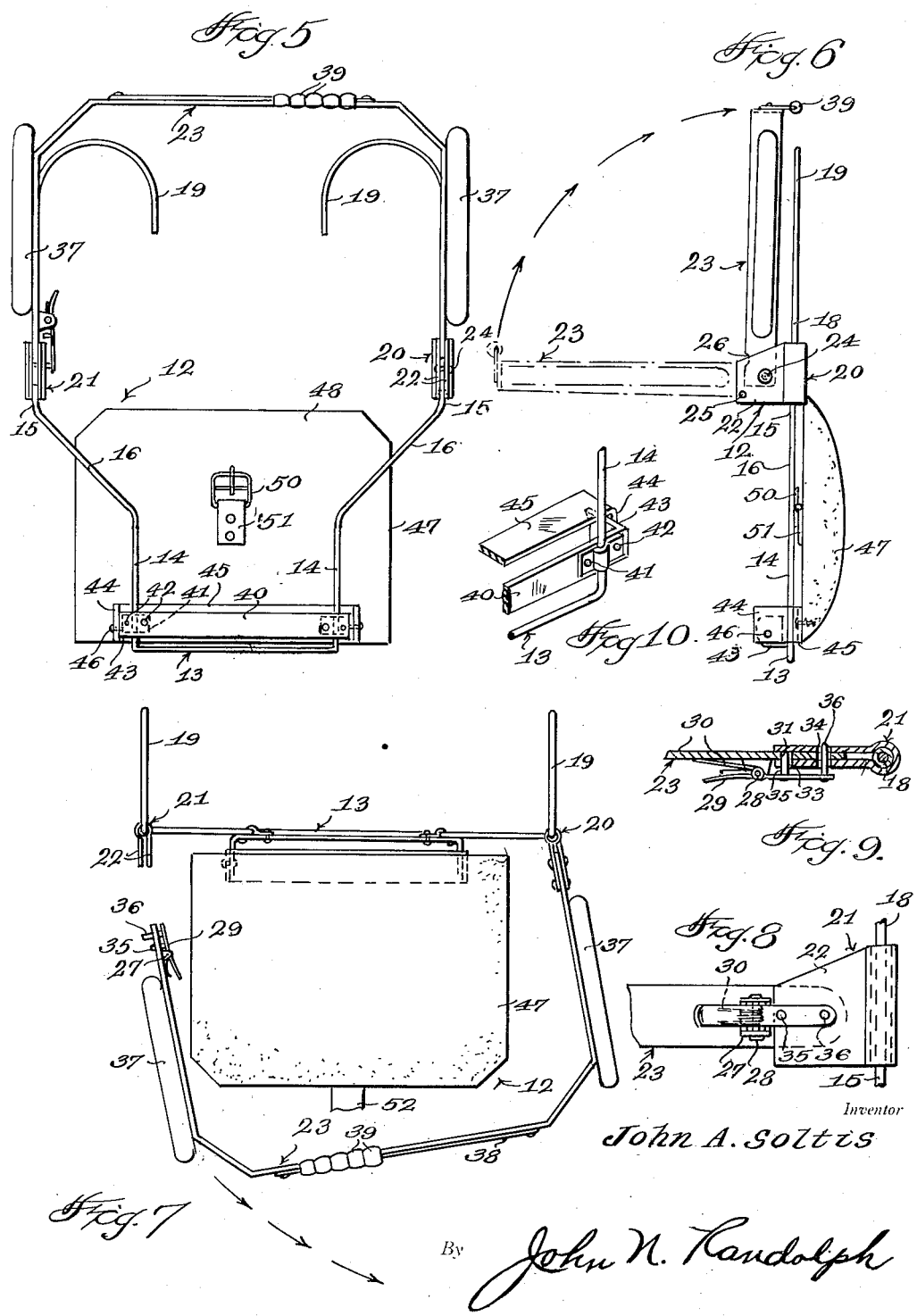
Inventor
John A. Soltis
By John N. Randolph
Attorney Patented Dec. 12, 1950

2,533,527

UNITED STATES PATENT OFFICE 2,533,527

BABY'S AUTOMOBILE SEAT

John A. Soltis, Reading, Pa.

Application July 2, 1948, Serial No. 36,772

10 Claims. (Cl. 155—11)

This invention relates to a novel automobile seat for babies and has particular reference to the provisions of a seat of extremely simple construction and which is capable of being economically manufactured and sold and which may be folded into a compact form when not in use.

A primary object of the present invention is to provide an automobile seat for babies which is so constructed that the seat can be swung downwardly and out of the way to enable the baby to stand on the vehicle seat while being retained by a guard rail of the baby's seat so that the child may turn around and face in any direction but will be prevented from walking along or off of the vehicle seat.

Another and particularly important object of the present invention is to provide a baby seat having a swingably supported guard rail capable of being swung laterally for disengaging one end thereof from the frame and so that a child may walk or be moved laterally into or from the seat thereby eliminating the necessity of lifting the child into or out of the seat over the guard rail thereof.

Another object of the invention is to provide a baby's automobile seat including hook portions for engagement over the back of a vehicle seat and which are detachably connected to the seat frame to enable said hook portions to be swung to positions substantially parallel to the frame when the seat is folded for transportation or storage and also to enable the hook portions to be replaced thereby permitting the use of hooks particularly sized to fit seat backs of various makes of automobiles.

Another object of the invention is to provide means detachably connected to the guard rail for supporting the seat portion in an operative position and which additionally provides means for retaining the child or baby properly positioned in the seat.

Still a further object of the invention is to provide a seat portion which is adjustable relatively to the seat frame for adapting the seat to babies and young children of different ages and sizes.

Various other objects and advantages of the invention will hereinafter become more fully apparent from the following description of the drawings, illustrating preferred embodiments thereof, and wherein:

Figure 1 is a front elevational view showing the baby's seat in an operative position;

Figure 2 is a side elevational view thereof;

Figure 3 is a top plan view of the baby's seat;

Figure 4 is an enlarged, fragmentary horizontal sectional view taken substantially along a plane as indicated by the line 4—4 of Figure 1;

Figure 5 is a plan view showing the seat in a folded position;

Figure 6 is an edge elevational view of the seat in a folded position;

Figure 7 is a plan view showing the guard rail partially opened;

Figure 8 is an enlarged vertical sectional view taken substantially along a plane as indicated by the line 8—8 of Figure 3;

Figure 9 is a view similar to Figure 4 but showing the guard rail in a fully latched position;

Figure 10 is an enlarged fragmentary perspective view of a portion of the seat showing the means for adjustably clamping the seat structure to the frame, and Figure 11 is an enlarged fragmentary vertical sectional view, partly in side elevation of a modification of the structure as illustrated in Figures 4 and 9.

Referring more specifically to the drawings, the novel baby's automobile seat in its entirety is designated generally 12 and includes a frame 13 preferably formed of a single strand of relatively heavy gauge wire or from a rod and which includes an intermediate U-shaped portion having corresponding substantially parallel legs 14. The terminals of the rod or strand constituting the frame 13 are outwardly offset with respect to the legs 14 and said terminals 15 are threaded, as best seen in Figure 11. The frame 13 also includes outwardly and upwardly diverging portions 16 connecting the upper ends of the legs 14 with the terminal portions 15. Each of the threaded terminals 15 is adapted to threadedly engage in an end of a threaded sleeve 17 and the opposite end of each threaded sleeve 17 is adapted to receive the threaded shank end 18 of a hook 19 which is disposed thereabove. The hooks 19 are adapted to engage over the upper edge of the back rest of a vehicle seat, not shown, for suspending the frame 13 against the forward side thereof and it will be readily obvious that the hooks 19 may be disconnected from the frame 13 by unscrewing them from the sleeves 17 to enable hooks 19 of different sizes to be interchangeably connected to the frame 13 for adapting the seat 12 to back rests of different sizes and so that the hooks as employed with the seat 12 will correctly fit a back rest of a particular make of vehicle. The hooks 19 may also be encased in rubber tubing or other covering means, not shown, to prevent injury to the back rest. The threaded connections of the hooks 19 to the sleeves 17 also permit said hooks to be swung from their operative positions substantially at right angles to the plane of the frame 13, as illustrated in Figures 1, 2 and 3, inwardly to position substantially parallel to said frame, as illustrated in Figure 5, when the seat 12 is folded for transportation or storage.

A bracket, designated generally 20, formed of a single sheet of metal is secured around one of the sleeve members 17 by being folded upon itself and having its intermediate portion disposed around and clamped to said sleeve. A similar bracket 21 is secured in the same manner around the other sleeve 17 and said brackets are each provided with substantially parallel portions 22 which extend inwardly or forwardly from the frame 13.

A guard rail, designated generally 23 composed of a relatively wide band or strip of metal has one end thereof disposed relatively loosely between the portions 22 of the bracket 20 and said end is pivotally connected to the bracket 20 by a pivot pin 24 which extends therethrough and through the portions 22 and which is provided with headed ends. A stop pin 25 also extends between the portions 22 of the bracket 20 and is disposed adjacent the lower outer corner thereof for engagement with the bottom edge of the guard rail 23, preferably with a notched portion 26 thereof, to limit the downward swinging movement of said guard rail and to prevent the end thereof attached to the bracket 20 from swinging downwardly beyond a position substantially at a right angle to the frame 13.

A bearing member 27 is attached to the inner side of the guard rail 23 adjacent its opposite end and has transversely spaced ears for receiving a pivot pin 28 on which a latch bar 29 is pivotally mounted intermediate of its ends. A spring 30 carried by the pivot pin 28 urges the inner end of the latch bar 29 outwardly with respect to the guard rail 23 and urges the opposite end thereof which is disposed adjacent the terminal of the guard rail inwardly with respect thereto. Said terminal of the guard rail is provided with longitudinally spaced openings 31 and 32 to register with complementary openings 33 and 34, respectively, of the portions 22 of the bracket 21 when said last mentioned end of the guard rail is inserted therebetween. The openings 31, 32, 33 and 34 are elongated slightly in a longitudinal direction. The openings 31 and 32 are adapted to accommodate a relatively short pin 35 which projects from the inner side of the last mentioned end of the latch bar 29 and a pin 36 also carried by said last mentioned end of the latch bar 29 engages in the openings 32 and 34. It will be readily obvious that the spring 30 will normally hold the pins 35 and 36 in their positions of Figure 9 for latching the guard rail 23 in its operative position substantially at a right angle to the frame 13, as illustrated in Figures 1, 2 and 3. When it is desired to fold the guard rail 23 to a position substantially parallel to the frame 13, as illustrated in Figure 6, the inner end of the latch bar 29 is pressed inwardly or toward the adjacent portion of the guard rail 13, against the action of the spring 30, until the pin 35 disengages the openings 31 and 32. The pin 36 will then still be in engagement with the opening 32 to form a pivot for said last mentioned end of the guard rail to permit said guard rail to be swung upwardly and toward the hooks 19. Also, by further rocking the latch bar 29, the pin 36 can also be disengaged from the openings 32 and 34 to permit the guard rail 23 to be swung horizontally, as illustrated in Figure 7, by disengaging the latch carrying end thereof from the bracket 21 and permitting said end to swing through an arc of approximately 90° so that a child can walk or be moved laterally into or out of the seat 12. This swinging movement of the guard rail 23 is accomplished by the bracket 20 turning relatively to the sleeve 17 engaged thereby and affords a simple and very practical means for applying a child to or removing a child from the seat without the necessity of lifting the child over the guard rail.

The guard rail 23 at the sides thereof is preferably provided with arm rests 37 and the outer, intermediate portion of said guard rail carries a rod 38 is spaced therefrom and on which is slidably mounted a plurality of beads 39 forming a toy for amusement of the child.

As best illustrated in Figures 5 and 10, a bar 40 is secured to the frame 13 by a pair of clamp members 41 each of which engages one of the frame legs 14 and which clamp members are secured to the bar 40 by screw fastenings 42. The fastenings 42 can be tightened for clamping the legs 14 between the clamp members 41 and the bar 40 or may be loosened for adjusting the seat upwardly or downwardly on the legs 14 with respect to the frame 13. The bar 40 has outwardly projecting ends 43 each of which is adapted to receive an angularly turned end 44 of a bar 45. The ends 43 and 44 are pivotally connected by rivets or similar fastenings 46 to permit the bar 45 to be swung around the bar 40 from a position in front of the frame 13 as illustrated in Figures 2 and 10 to a position behind said frame, as illustrated in Figure 6.

An upholstered seat 47 includes a substantially rigid bottom or base 48 the rear edge portion of which rests on and is secured by fastenings 49 to the bar 45 so that when the bar 45 is in its position of Figure 10 the seat 47 will be disposed in an operative position substantially at a right angle to the plane of the frame 13 or when said bar 45 is swung to a position behind the frame, as illustrated in Figures 5 and 6, the seat 47 will likewise be disposed behind the frame and substantially parallel thereto.

A buckle 50 is connected by a flexible strap 51 to the underside of the seat base 48 for adjustably connecting one end of a strap 52 thereto. The strap 52 is adapted to extend outwardly and upwardly from the seat 47 and is provided at its opposite end with a hook 53 which detachably engages in an opening 54 in the outer, intermediate portion of the guard frame 23 for detachably supporting the seat 47 in its operative position of Figures 1, 2 and 3.

From the preceding description it will be readily apparent that the seat 12 when in an operative position as illustrated in Figures 1, 2 and 3 is adapted to provide a vehicle seat for a child who sits upon the seat 47 straddling the strap 52 which combines with the guard rail 23 to retain the child in the seat 12. By detaching the hook 53 from the opening 54 the seat 47 will be permitted to swing downwardly to its dotted line position of Figure 2 so that the child may stand up on the vehicle seat over the back of which, not shown, the hooks 19 engage and will be retained by the guard rail 23 from falling off of the vehicle seat or walking longitudinally thereof but will be permitted by said guard rail to turn around in the seat 12 so that the child may face in any direction. By releasing the latch 29, as previously described, and swinging the guard rail 23 to an open position, as illustrated in Figure 7, the child may walk or be moved laterally out of the seat 12. It will be noted that said guard rail 23 opens in a direction to permit the child to enter or leave the seat from the side thereof away from the driver's wheel. By partially engaging the latch structure as previously described and as illustrated in Figure 4, the guard rail 23 can be swung upwardly as seen in Figure 6, the hooks 19 can be turned inwardly and the seat 47 swung to a position behind and substantially parallel to the frame 13 to thereby arrange the seat 12 in a folded position for storage or transportation.

Figure 11 illustrates a slight modification of the invention wherein the bracket 21a is provided with longitudinally and vertically spaced pins 55 and 56 extending between the side portion 22a thereof and the last mentioned end of the guard rail 23a has the latch omitted therefrom and in lieu thereof its terminal portion is provided with a recessed upwardly opening notch 57 to receive the pin 55 and a downwardly opening notch 58 to receive the pin 56 for combining with the parts 24 and 25 to support the guard rail 23a in an operative position. By swinging the guard rail 23a upwardly slightly its notched end can be disengaged from between the pins 55 and 56 so that the guard rail can be swung outwardly in the manner as illustrated in Figure 7 or the notched end thereof can be swung upwardly on the pin 55 as a pivot to position the guard rail 23a substantially parallel to the frame 13. This structure, as illustrated in Figure 11 is of a simpler character than the latch structure as illustrated in Figures 4 and 9 and its use as an alternative means is contemplated since a baby's seat when constructed employing the means of Figure 11, may be manufactured at less expense than the seat as illustrated in Figures 1 to 10.

Various other modifications and changes are likewise contemplated and may obviously be resorted to, without departing from the spirit or scope of the invention as hereinafter defined by the appended claims.

I claim as my invention:

1. A baby's automobile seat comprising a frame adapted to be disposed against the forward side of the back rest of an automobile seat, hook members extending upwardly from said frame and adapted to engage over the upper edge of the back rest for supporting the frame thereon, a guard rail, means for swingably connecting one end of said guard rail to a side of the frame for swinging movement of the guard rail in a plane substantially at a right angle to the plane of the frame, said end of the guard rail being pivotally connected to said means for upward swinging movement relatively thereto in a plane at a right angle to the plane of the first mentioned swinging movement of the guard rail, a stop connected to said means and disposed to engage said guard rail end for supporting the guard rail in a position at a right angle to the frame and preventing the guard rail from swinging downwardly beyond said position, means for detachably connecting the opposite end of the guard rail to the other side of said frame, said last mentioned end of the guard rail being mounted for swinging movement in an upward direction relative to said last mentioned means, a seat swingably connected to the frame below said guard rail, and flexible means detachably connected to the guard rail for supporting the seat in an operative position substantially at a right angle to the frame.

2. A baby's automobile seat as in claim 1, said last mentioned means being disengageable from the guard rail, and said seat being connected by an offset hinge to the frame for swinging movement in a vertical plane to a depending position or to a folded position behind and substantially parallel to the frame.

3. A restraining device for children comprising a frame adapted to be disposed against the forward side of the back rest of a motor vehicle seat and including upper hook-shaped portions adapted to engage over the upper edge of the back rest for supporting the frame thereon, a pair of brackets connected to laterally spaced portions of the frame, one of said brackets being swivelly connected to the frame, a guard rail having one end pivotally connected to said swivel bracket for upward swinging movement relative thereto, a stop on said bracket for supporting the guard rail at substantially a right angle to the frame, the other end of said guard rail detachably engaging in the other bracket, and latch means for detachably connecting said last mentioned end of the guard rail to the last mentioned bracket whereby the last mentioned end of the guard rail can be swung away from the frame when said latch means is released.

4. A device as in claim 3, said latch means including means for pivotally connecting the last mentioned end of the guard rail to the last mentioned bracket when the latch means is in a partially released position to permit the guard rail to be swung upwardly to a folded position substantially parallel to the plane of the frame.

5. A device as in claim 3, a seat, means adjustably connected to said frame for movement toward and away from the guard rail and on which said seat is supported.

6. A device as in claim 3, a seat, means adjustably connected to said frame for movement toward and away from the guard rail and on which said seat is supported, said seat being swingably connected to said last mentioned means on a pivotal axis spaced from the plane of the frame for swinging movement from a position at substantially a right angle to the frame to a depending, inoperative position relatively thereto or to a folded position behind the frame.

7. A device as in claim 3, a seat, means adjustably connected to said frame for movement toward and away from the guard rail and on which said seat is supported, said seat being swingably connected to said last mentioned means for swinging movement from a position at substantially a right angle to the frame to a depending, inoperative position relative thereto or to a folded position behind the frame, and means adjustably connected to the seat and detachably connected to the guard rail for supporting the seat in its first mentioned, outwardly projecting and operative position.

8. A device as in claim 3, said latch means including a pair of spaced pins extending between portions of the last mentioned bracket, said last mentioned end of the guard rail having notches in the upper and lower edges thereof for detachably engaging said pins for supporting said end of the guard rail substantially perpendicular to the plane of the frame, said last mentioned end of the guard rail being swingable relatively to one of said pins for forming a pivotal connection between the guard rail and last mentioned bracket and being detachable from the last mentioned bracket in one position of its swinging movement.

9. A restraining device for children comprising a frame adapted to be disposed against the forward side of the back rest of a seat including upper hook-shaped portions adapted to engage over the upper edge of the back rest for supporting the frame thereon, a pair of brackets connected to laterally spaced portions of the frame, one of said brackets being swivelly connected to the frame, a guard rail having one end pivotally connected to said swivel bracket for swinging movement in a plane at an angle to the plane of swinging movement of the swivel bracket relative to the frame, the other end of the guard rail detachably engaging the other bracket, latch means detachably connecting the last mentioned end of the guard rail to the last mentioned bracket whereby the last mentioned end of the guard rail can be swung away from the frame when the latch means is released, said latch means including a stop for supporting the guard rail in a position at an angle to the frame and rigidly with respect thereto.

10. A restraining device as in claim 9, a seat, means pivotally connecting the seat to the frame beneath said brackets for swinging movement from an operative position at an angle to the frame to a depending position relative to the frame, and a connecting member attached to the outer free end of the seat and detachably connected to the intermediate portion of the guard rail to support the seat beneath the guard rail and substantially parallel thereto when the guard rail is supported by the stop in a position at an angle to the frame.

JOHN A. SOLTIS.

REFERENCES CITED

The following references are of record in the file of this patent:

UNITED STATES PATENTS

| Number | Name | Date |
|---|---|---|
| 696,680 | Hunting | Apr. 1, 1902 |
| 1,010,812 | Shuttleworth | Dec. 5, 1911 |
| 1,149,545 | Sherry | Aug. 10, 1915 |
| 1,853,848 | Cross | Apr. 12, 1932 |
| 2,318,475 | Ellner | May 4, 1943 |
| 2,349,092 | Hammer | May 16, 1944 |